United States Patent

Nagao

[15] 3,700,827

[45] Oct. 24, 1972

[54] MAGNETIC HEAD INCLUDING THIN MAGNETIC FILM SEPARATED BY A GAP SPACER

[72] Inventor: Morimasa Nagao, Tokyo, Japan

[73] Assignee: Nippon Electric Company, Limited, Tokyo, Japan

[22] Filed: Jan. 27, 1971

[21] Appl. No.: 110,054

[30] Foreign Application Priority Data

Jan. 31, 1970 Japan ........................45/8658
Jan. 31, 1970 Japan ........................45/8659

[52] U.S. Cl. ..........................................179/100.2 C
[51] Int. Cl. ...............................................G11b 5/22
[58] Field of Search..........179/100.2 C; 340/174.1 F; 346/74 MC

[56] References Cited

UNITED STATES PATENTS

| | | | |
|---|---|---|---|
| 3,140,361 | 7/1964 | Eldridge | 179/100.2 C |
| 3,611,417 | 10/1971 | Sauter et al. | 179/100.2 C |
| 3,171,903 | 3/1965 | Wheeler et al. | 179/100.2 C |
| 3,237,280 | 3/1966 | Manders | 179/100.2 C |
| 3,397,289 | 8/1968 | Pfost et al. | 340/174.1 F |

*Primary Examiner*—Bernard Konick
*Assistant Examiner*—Robert S. Tupper
*Attorney*—Sandoe, Hopgood and Calimafde

[57] ABSTRACT

A thin film magnetic head includes a substrate on which thin film core portions are formed. The core films overlap at one end and a gap spacer is interposed between the overlying ends of the core portions to form a gap having a width defined by a reduced width end portion of one of the core portions and corresponding to the track width.

4 Claims, 6 Drawing Figures

INVENTOR
Morimasa Nagao
by
Sandoe, Hopgood & Calimafde
ATTORNEYS

MAGNETIC HEAD INCLUDING THIN MAGNETIC FILM SEPARATED BY A GAP SPACER

This invention relates to thin film magnetic such as those used in a memory with a magnetic disc or drum.

Magnetic heads used that have been previously used in memories of the types employing a magnetic disc or drum include ferrite thin plates cut away from a ferrite block, or laminated plates of etched permalloy foils as their magnetic cores; to fabricate these magnetic heads, however, requires many steps of operation. In addition, the required manufacturing steps include many steps involving the need for precise machining, and the magnetic core itself is remarkably thin and small, so that the yield in manufacturing the magnetic head is relatively quite low. Modern computer technology has produced a demand for an enlarged capacity memory and the use of narrow track heads. However, in view of the foregoing present state of the art, manufacturing of the narrow track magnetic head which requires a more precise machining operation is very difficult even by the use of improved techniques in the conventional process. To improve the foregoing situation, a thin film magnetic head has been proposed ( The Institute of Electric and Communication Engineers in Japan, Materials of the Magnetic Recording Research Association, 1965, No.1 ). According to this publication, the magnetic core is made of electrodeposited permalloy and the track width is regulated by the film thickness of a permalloy film. However, it has been found that this proposed structure is difficult to put into practice. The present-day track width of a magnetic head is in the order of 150 – 200$\mu$, so, in consideration of the degree of accuracy in positioning the magnetic head in the direction of track width, a readout output and the like, the track width in the future will be at best in the order of several tens of microns. Thus, in the use of the head proposed in the aforesaid publication, the thickness of the core could not be made thinner than several tens of microns even in the future. However, if the metallic magnetic core of this order of thickness is employed, that thickness is in the range in which the skin effect becomes influential because the repetition frequency of writing and reading relative to the magnetic disk and the like is in the order of several mHz, so that thin film magnetic heads of this type have no practical use. It has also been considered that a ferrite thin film of large resistance could be used well; but, since this requires the steps of etching a thick film where a high degree of accuracy is difficult to achieve, heat treatment at higher than 1,000° C as a post-treatment and the like, this proposal has also present serious difficulties.

It is an object of the present invention to provide a thin film magnetic head of low cost which does not need a complete machining operation or at least a precise machining operation, and which can be manufactured by way of the batch system.

It is another object of the present invention to provide a thin film magnetic head the track width of which can be chosen over a wide range and which is operable at high frequencies.

According to the present invention, a thin film magnetic head comprises a plurality of magnetic cores, a coil would about a portion of the cores, and a gap spacer wherein at least the magnetic cores forming the gap are made of magnetic thin film are positioned on one even surface of a substrate.

Further, according to the present invention, portions of the thin film magnetic core forming the gap have the gap spacer interposed therebetween and lie one upon another in the thickness-wise direction of the substrate, i.e., in the film thickness-wise direction of the magnetic core, and portions of the magnetic core opposing the track surface are photo-etched so that the width of these portions corresponds to at least the track width of a magnetic recording surface.

According to the present invention, the thin film magnetic head is constructed such that the thin film magnetic cores are formed on at least the inner side and end faces of a group of substrates which form a closed structure and leave a space thereinside as they are caused to oppose one another at their end faces or side faces. The gap is formed between the faces of one of the opposing pairs, and a read/write coil is wound passing through the afore-mentioned space.

Further, according to the present invention, the magnetic thin films forming the gap have a width in the normal direction of a magnetic medium corresponding to the track width along an appropriate length.

Therefore, in the present invention, the track direction corresponds to the thickness-wise direction of the substrate and thin film magnetic core, and the track width is independent of the thickness of the magnetic core. Thus so that, even if the metallic magnetic material is used as the magnetic core, it is possible to make the core thickness free of skin effect problems at high repetition frequencies of writing and reading. Further, according to the present invention, the magnetic core portions determining the track width are formed by a photo-etching technique on the even substrate surface, so that, in considering that present-day photo-etching technique can easily provide patterns of 10 $\mu$ width, thin film magnetic heads having a voluntary track width wider than 10 $\mu$ can be fabricated easily. Furthermore, since the vicinity of the gap which needed a precise machining operation in the prior art is shaped by a photo-etching process in the present invention, the yield rises, and since the batch system can also be employed to manufacture the magnetic head.

The other objects and features of the present invention will become clear from the description of embodiments of the present invention relative to the attached drawing.

Figures 1, 2, 3, 4A, 4B, 5:
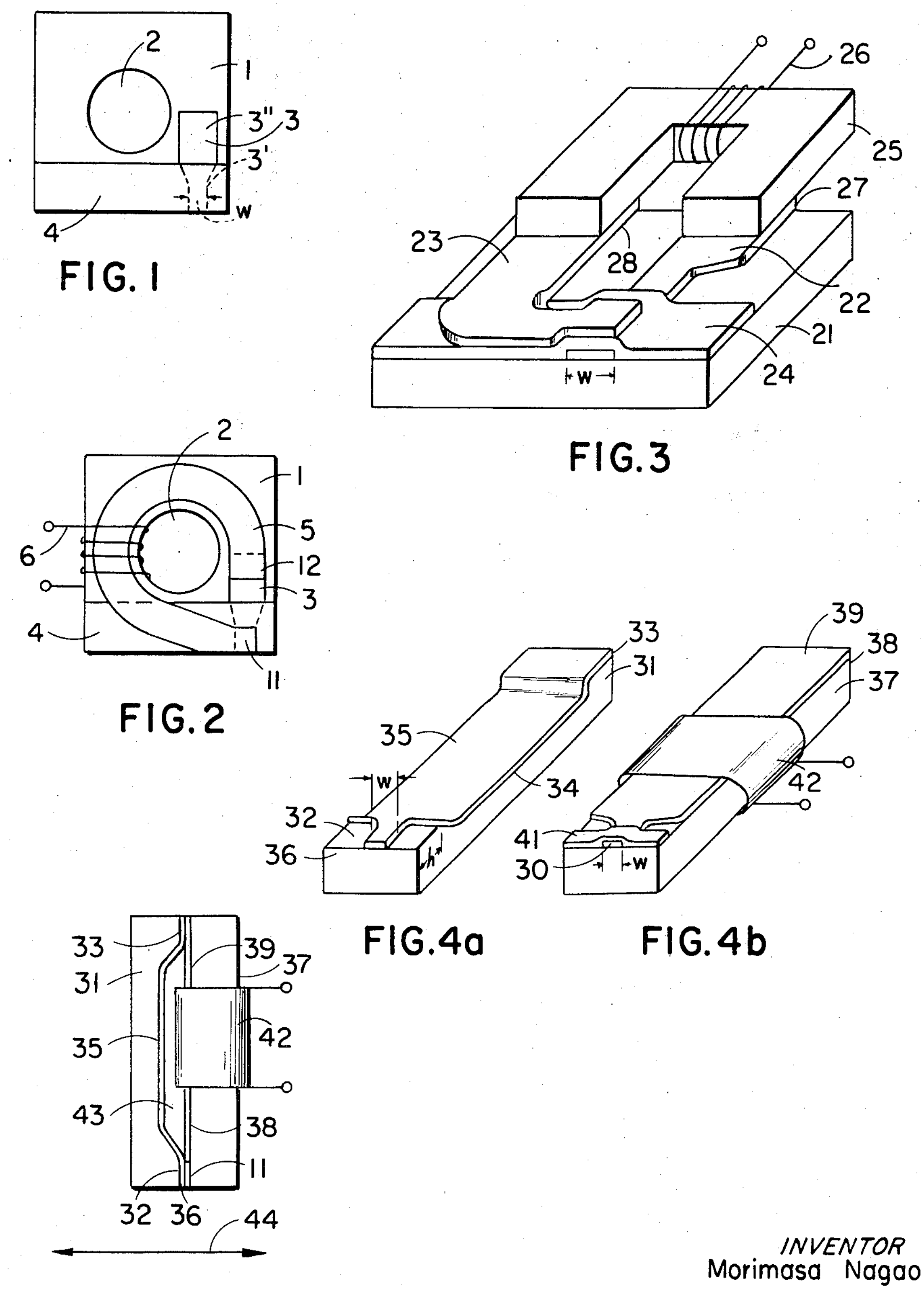
FIG. 1 is a top plan view of a partially finished thin film magnetic head of an embodiment of the present invention.
FIG. 2 is a top plan view of a finished magnetic head.
FIG. 3 is a perspective view of a thin film magnetic head of a second embodiment of the present invention.

FIG. **4*a*** is a perspective view of one part of a thin film magnetic head of a third embodiment of the present invention;

FIG. **4*b* is a perspective view of the other part which is assembled with the one part shown in FIG. 4*a*; and FIG. 5 is a side view of the thin film magnetic head made by assembling the parts shown in FIGS. 4*a* and 4*b***.

In the embodiment of the invention shown in FIG. 1, permalloy is vacuum evaporated over one whole surface of an even substrate 1 made, for instance, of glass and having a hole 2 formed at its center. The permalloy is thereafter photo-etched to form a portion 3 of a thin film magnetic core. It is noted that the portion 3 of this core is shaped such that it has a reduced width portion 3' forming a gap having a width *W* corresponding to the track width. The remainder of the portion 3 has a sufficient width, larger than the track width, so as to provide low reluctance and reduced leakage flux. Thereafter, surface portions of the substrate 1 exclusive of the portion 3' forming the gap and its vicinity of the magnetic core portion 3 are covered by the use of a mask, and a gap spacer 4, which may be made of glass, is formed by a sputtering process only over the portion 3' forming the gap and its vicinity. glass such as fused quartz and hard glass, or nonmagnetic material such as alumina, copper and nonmagnetic ferrite may be advantageously used as the material of gap spacer 4. The thickness of the gap spacer depends upon the magnetic storage density. For example, the spacer is made to have a thickness of about 3 $\mu$ for a storage density of 2,000 bpi, and about 1.5 $\mu$ in case of a storage density of 4,000 bpi. Then, permalloy is vacuum deposited onto the whole surface of the substrate 1 where the thin magnetic core portion 3 and the gap spacer 4 have been formed, and this permalloy is then photo-etched to have a form such that, as shown in FIG. 2, one end portion lies upon the remainder portion 3'' of the thin film magnetic core portion 3, extending over along the hole 2 of the substrate 1 in an arcuate form, and the other end portion lies upon the portion 3' of the thin film magnetic core portion 3 forming the gap, whereby, the remainder portion 5 of the thin film magnetic core is fabricated. Then, a write/read coil 6 is wound by being threaded through the hole 2. According to this fabrication technique, the thin film magnetic core portions 3 and 5 contact directly together at portion 12 in FIG. 2, and the gap is formed at portion 11. In this case, the track direction is the thickness-wise direction of the substrate 1 and the thin film magnetic core portions 3 and 5, that is, the normal direction to the drawing sheet, and the width *W* shown in FIG. 1 corresponds to the write track width. Therefore, since the track width is not determined by the film thickness of the magnetic core, it can be chosen freely. Even in the case that the thin film magnetic core is made of permalloy, which is a metallic magnetic substance, as in the case of this embodiment, when its thickness is made wider than 3 $\mu$, no skin effect problem occurs so long as the repetition frequency is 10MHz or below. Because the fabrication of the width *W* of 10 $\mu$ can be easily achieved by known photo-etching techniques, the thin film magnetic head having a track width wider than this value can be easily manufactured in accordance with this embodiment. In addition, this embodiment does not need any machining operation as noted above, so that the yield in manufacturing is improved remarkably, and a number of thin film magnetic cores can be produced by providing a number of such patterns as that of this embodiment on a large size substrate and scribing them. There are thereby obtained low cost thin film magnetic heads. In this embodiment, the portion 12 where the magnetic core portions 3 and 5 overlap can be positioned in any area except where the gap is formed. Also, in this embodiment, the fabrication sequence of the thin film magnetic core portions 3 and 5 may be interchanged.

In the embodiment of the invention shown in FIG. 3, portions 22 and 23 of the thin film magnetic core and a gap spacer 24 are formed on one even surface of a substrate 21 the latter being, made of glass for instance, in the same manner as that in the first embodiment. However, this second embodiment differs from the first embodiment in that the thin film magnetic core portions 22 and 23 respectively do not contact directly together at their ends opposite to the gap; but are magnetically coupled together through a ferrite magnetic core 25 of the balk type wound with a coil 26 which is positioned protruding outwardly from the substrate 21 and contacts at portions 27 and 28 with the thin film magnetic core portions 22 and 23 respectively. Therefore, the thin film magnetic head of this embodiment may have the same frequency characteristic and track width variation as that of the first embodiment. In case of this embodiment, a machining operation of the ferrite magnetic core 25 is required; but it is not a precise machining operation, so that there is no appreciable influence upon the improvement of yield which is one of the objects of the present invention. One of the important advantages of this embodiment is that there is no need for using a precisely shaped substrate, so that this embodiment may be readily manufactured by a batch system.

In this embodiment, instead of positioning the ferrite magnetic core 25 to project in a direction parallel to the substrate surface as shown in FIG. 3, the core 25 may be positioned to project in a direction normal to the substrate surface so that its components lie in that direction. The form of the ferrite magnetic core is not necessarily limited to the U-shaped type as shown in FIG. 3; it may be formed in the semi-ring type, for instance, so that a previously wound coil can be mounted thereon.

Referring now to FIGS. 4*a*, 4*b* and 5, there is shown a third embodiment of the present invention. The entire surface of one side of substrates 31 and 37, which may be made of glass, is vacuum deposited with permalloy to respectively form permalloy portions 35 and 39 on these surfaces. Thereafter, by the photo-etching process, core portions 36 and 30 each having a width corresponding to the track width *W* are formed. Then, to cover at least the upper surface of the thin film magnetic core portion 30, sputtering is performed by the use of a mask to provide a gap spacer 41 made of glass, for instance, and a coil 42 is wound about the substrate 37 provided with the thin film magnetic core 39. The foregoing elements are thereafter assembled as shown in FIG. 5 and secured together with an adhesive whereby the composite thin film magnetic head is produced.

It will be noted as shown in FIGS. 4*a* and 5 that the surface of the substrate 31 to which the thin film magnetic core 35 is attached is shaped such that its center portion is caved in in comparison with end faces 32 and 33 in the vicinity of both end portions and, when mated with the face 38 of the substrate 37, they define a space 43 therebetween through which the coil 42 is threaded. The thin film magnetic core portions 36 and 30 form the gap with the interposition of the gap spacer 41, its width W corresponds to the write track width, and its length having the width *W* therealong is preferably as long as the height *h* of the end face 32. Further, it is desireable that the gap spacer 41 is not formed on the portion of the thin film magnetic core 39 which contacts a portion of the end face 33 of the thin film magnetic core 35.

In this embodiment, the track direction is in the direction of the arrow 44 in FIG. 5; but the track width is not determined by the thickness of the thin film magnetic core, so that this film thickness can be selected at will. Even though the thin film magnetic core is made of permalloy, which is a metallic magnetic substance as is the case of this embodiment, if its film thickness is made thinner than 3 $\mu$, no skin effect problem occurs at high repetition frequencies of 10MHz. Since the known photo-etching techniques can easily produce 10 $\mu$ patterns as noted above, narrow track magnetic heads having any desired track width not narrower than the above size can be easily fabricated according to this embodiment, which is substantially narrower than the width of the prior art. This embodiment requires, in manufacturing the thin film magnetic core, only one step of applying the thin films and another step of photo-etching, and does not need any machining operation, so that the yield can be improved and a low cost magnetic head can be produced.

In the embodiment of the invention shown in FIGS. 4*a*, 4*b* and 5, the substrate is not necessarily limited to the form shown in the drawing; it may, for example consist of a combination of two divided ring elements having a rectangular cross-section. Generally speaking, it is sufficient for the substrate to be in a form such that it consists of plural segments which, when assembled together with the end or side faces facing one another, leave a space sufficient to thread a coil therethrough and has a substantially closed structure. Material of the substrate can be chosen among nonmagnetic metal and insulation depending upon the methods employed for forming the thin film magnetic core.

The thin film magnetic core does not harm even if it is attached to the side faces except for the inside face; but, in order to prevent deterioration of the characteristics of the magnetic head, it is desirable to exclude the vicinity of the gap. Then, in such a structure, increased processing steps for forming the thin film magnetic core or the step of etching thin film magnetic cores lying not on the same plane are necessitated.

While in the foregoing description of the several embodiments of the present invention the vacuum deposited permalloy was used for the thin film magnetic core, the present invention need not be limited to such material and techniques; but other thin film techniques such as sputtering and electric field or nonelectrolytic metal plating may be used, and nonmetallic magnetic core material such as a ferrite thin film may be employed. In addition, the gap spacer may be made not only of glass, but also of another nonmagnetic material.

Thus while only several embodiments of the present invention have been herein specifically described, it will be apparent that modifications may be made therein without departing from the spirit and scope of the invention.

What is claimed is:

1. A thin film magnetic head comprising a substrate having a side surface facing a magnetic recording medium, a polepiece including first and second opposing magnetic thin films formed on one surface of said substrate and spaced from one another by a gap and terminating flush with said side surface, a magnetic member for coupling between said first and second magnetic thin films, a gap spacer of thin nonmagnetic film interposed between said first and second magnetic thin films and terminating flush with said side surface, and a coil mounted about said magnetic member.

said first magnetic thin film extending on one surface of said substrate and having a preselected length in the normal direction to said magnetic recording medium and a width corresponding to a write track width, said gap spacer overlying said first magnetic thin film and said second magnetic thin film overlying said gap spacer on said first magnetic thin film and extending therefrom on said one surface of said substrate.

2. The thin film magnetic head of claim 1, wherein said magnetic member comprises a rigid U-shaped bulk magnetic core, one leg of said U-shaped core being coupled to said first magnetic thin film and the other leg of said U-shaped core being coupled to said second magnetic thin film, said coil being mounted about the portion of said U-shaped core bridging the legs thereof.

3. The thin magnetic head of claim 1, wherein said substrate includes a hole formed therein from said one surface to an opposed surface, said magnetic member comprising a third magnetic thin film extending on said one surface of said substrate around said hole with one end of said third magnetic thin film being integrally connected to said second magnetic thin film, the other end of said third magnetic thin film partially overlapping and contacting said first magnetic thin film, said coil being mounted about said substrate and said third magnetic thin film through said hole.

4. The thin film magnetic head of claim 1, in which said one end portion of said one of said magnetic portions has a reduced width with respect to the remainder thereof, said reduced width corresponding to the write track width.

* * * * *